T. O. POTTER & J. W. SMITH.

Suspenders.

No. 5,593. Reissued Oct. 7, 1873.

Witnesses.
Geo H McGuire.
J E Maynadier.

Inventor.
Thomas O. Potter.
Joseph W. Smith

AM. PHOTO-LITHOGRAPHIC Co. N.Y. (OSBORNE'S PROCESS)

UNITED STATES PATENT OFFICE.

THOMAS O. POTTER AND JOSEPH W. SMITH, OF BOSTON, MASSACHUSETTS, ASSIGNORS TO THE BAY STATE SUSPENDER COMPANY.

IMPROVEMENT IN SUSPENDERS.

Specification forming part of Letters Patent No. 116,093, dated June 20, 1871; reissue No 5,593, dated October 7, 1873; application filed February 26, 1873.

*To all whom it may concern:*

Figure 1:
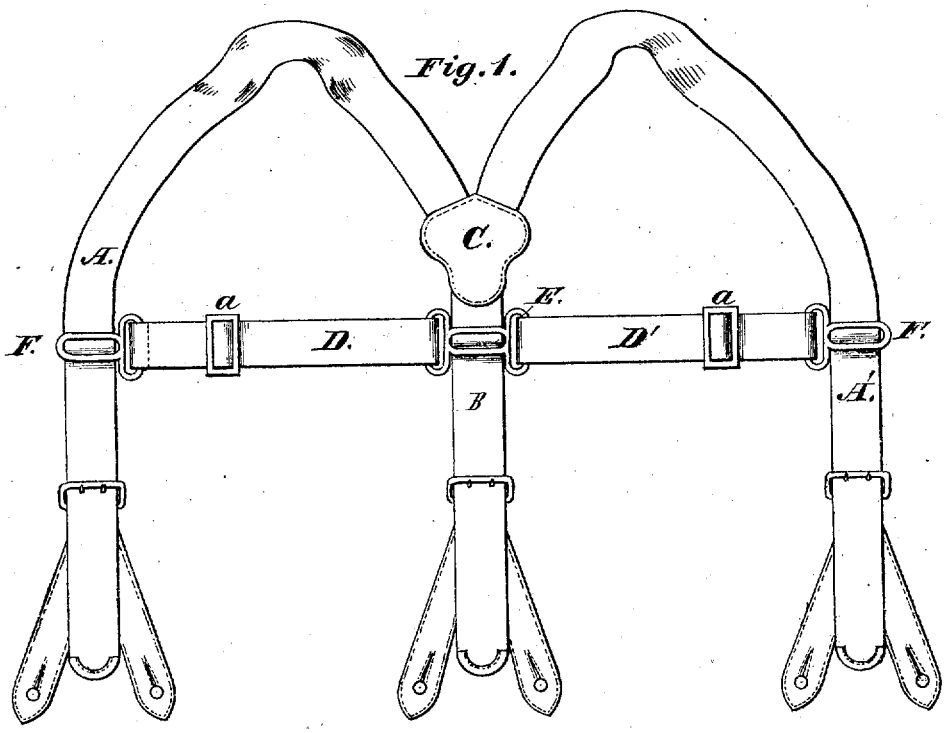
Figure 2:
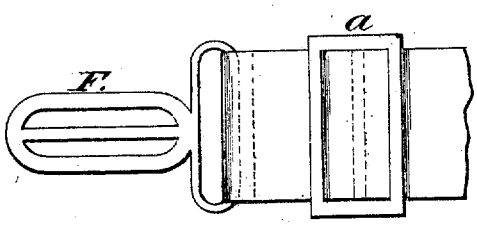
Figure 3:
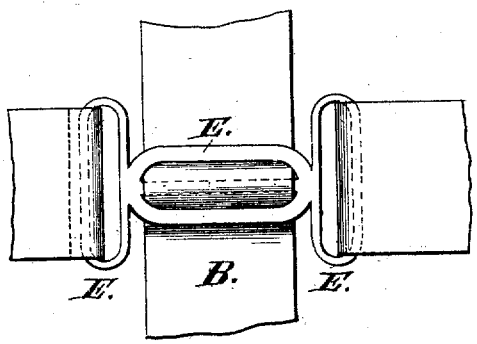

Be it known that we, THOMAS O. POTTER and JOSEPH WILLIAM SMITH, of Boston, Massachusetts, have invented certain Improvements in Combined Suspender and Shoulder-Brace, of which the following is a specification:

Figure 1 shows the construction of our combined brace and suspender, and Figs. 2 and 3 are detail views.

The suspender is formed of three straps, A, A′, and B, united together at C, as shown, or in any other suitable manner, and provided with short button-straps, or other suitable means of connecting the main straps with the pantaloons. The suspender thus formed is well known, and is not of our invention, which consists, first, in connecting the shoulder-straps A A′ with the dorsal strap B by means of straps D D′, which are, respectively, properly secured to the dorsal strap, and one of which is properly secured to each of the shoulder-straps.

We prefer to make the straps D and D′ adjustable as to length, as thereby the bracing effect can be increased or diminished. This may be effected as shown, or by attaching a buckle on each side of the dorsal strap, and passing the ends of the straps D D′ each through its buckle, or in many other ways. We also prefer to make the connection between the straps D D′ and the shoulder-straps adjustable, so that the connecting-point can be shifted to suit the wearer; and this we regard as a novel feature, although one of the minor points of our invention. We also prefer to connect the straps D and D′ with the shoulder-straps and with the dorsal strap by means of our slide and loop combined, as they can then be readily disconnected and reattached.

When disconnected, the straps A, A′, and B constitute a popular form of suspender, and when reattached the whole forms a novel and very excellent shoulder-brace and suspender combined; and this, also, we regard as new and as an important part of our invention. It is obvious, also, that we can supply the trade with the straps D D′ properly secured to the devices E and F, which can be applied at pleasure to any suspender consisting of two shoulder-straps united to a single dorsal strap.

The device F consists of a loop united to a slide, and forms a very compact device, by which a strap can be adjustably connected at any desired angle with another strap. The device E does not differ from F, except that a second loop is attached to the slide in order to admit of a second strap being adjustably connected to the strap which passes through the slide portion of the device.

We are aware that a suspender and brace combined, consisting of a dorsal strap and two shoulder-straps united together at C, substantially as is ours, are old and well known; but in all of them the other ends of the shoulder-straps are always united, either to the dorsal strap or to the connection C, so as to form shoulder-loops, to which the short buttoning-straps are secured in various ways. We disclaim, therefore, any form of shoulder-brace and suspender combined in which the front ends of the shoulder-straps A A′ are not free. It is obvious, also, from what we before stated, that we do not claim a suspender consisting of the straps A, A′, and B, united at C.

What we do claim is—

1. A suspender and shoulder-brace combined, consisting of the shoulder-straps A A′, the dorsal strap B, and the connecting-straps D D′, when the front ends of the shoulder-straps are free, and when the dorsal strap is connected to each of the shoulder-straps at C, and also by means of connecting-straps D D′, the whole being substantially as described.

2. The combination of the shoulder-straps A A′ and dorsal strap B, when united together at C, with the connecting-straps D D′ and their attachments E F F′, whether these connecting-straps be adjustable or not, the whole arranged and operating substantially as described.

3. The combination of two straps, A and D, and the sliding loop F, substantially as described.

4. A strap, D, in combination with the devices F, each consisting of a loop united to a slide, and one at each end of the strap, as above described.

THOMAS O. POTTER.
JOSEPH W. SMITH.

Witnesses:
GEO. H. MCGREW,
J. E. MAYNADIER.